(12) United States Patent
Tavlarides

(10) Patent No.: US 6,401,598 B1
(45) Date of Patent: Jun. 11, 2002

(54) TAP CARBONATION CONCENTRATOR

(76) Inventor: Demetrios Tavlarides, 6631 31$^{st}$ Pl., NW., Washington, DC (US) 20015

(*) Notice: Subject to any disclaimer, the term of this patent is extended or adjusted under 35 U.S.C. 154(b) by 0 days.

(21) Appl. No.: 09/817,053

(22) Filed: Mar. 27, 2001

(51) Int. Cl.$^7$ .............................. A23F 3/00; A23L 2/54; B01F 3/04
(52) U.S. Cl. ................. 99/323.2; 426/477; 261/DIG. 7
(58) Field of Search ............................. 99/323.2, 323.1; 426/477; 267/DIG. 7, 64.3, 122.1

(56) References Cited

U.S. PATENT DOCUMENTS

| | | | |
|---|---|---|---|
| 414,691 A | * 11/1889 | Feld et al. | 137/144 |
| 1,546,510 A | * 7/1925 | Possner | 141/374 |
| 2,447,716 A | * 8/1948 | Rowe | 261/122.1 |
| 3,615,673 A | * 10/1971 | Black et al. | 141/69 |
| 4,745,853 A | 5/1988 | Hoover | |
| 4,886,525 A | 12/1989 | Hoover | |
| 5,038,976 A | 8/1991 | McMillin | |
| 5,180,081 A | 1/1993 | McCann | |
| 5,736,072 A | * 4/1998 | Satoh | 261/119.1 |

* cited by examiner

Primary Examiner—Reginald L. Alexander
(74) Attorney, Agent, or Firm—William H. Bollman

(57) ABSTRACT

A method and apparatus for improving the carbonation in a soda fountain drink when served in a cup. A carbonation concentrator is inserted between the fountain head and the bottom portion of the cup (e.g., at the top of the ice) to cause backpressure at a point within the fluid in the cup as the soda is poured, increasing the absorption of the $CO_2$ carbonation into the poured fluid. The carbonation concentrator may be integrated into the fountain head, adapted to attach to an otherwise conventional fountain head, or integrated within the cup (i.e., disposable form). The carbonation concentrator may be attached to an otherwise conventional fountain head, formed integrally therewith, or to a lid. In disclosed embodiments, the carbonation concentrator is slid over the spout of a hand-held or wall-mounted fountain head and secured in an appropriate fashion. The carbonation concentrator includes a hollow interior passage allowing relatively unrestricted passage of the mixed drink directly toward the bottom of the cup (e.g., preferably directly to the bottom $\frac{1}{3}$ of the cup, e.g., to a point at the top of the ice). A localized loosely sealed 'chamber' is formed in a lower portion of the cup and pressurized with back pressure from the pouring of the soda, causing an increased pressure thereat and increased absorption of the $CO_2$ into the syrup and fluid of the drink. Accordingly, carbonation is improved within the drink by pressurizing a portion of the poured drink as it is poured, increasing the carbonation, providing more consistent carbonation, and generally improving the taste of a soda fountain drink, allowing for greater absorption of syrup, e.g., 10–15% greater absorption.

21 Claims, 12 Drawing Sheets

TOLERENCE CAN BE GREAT BETWEEN STRAW AND SLIDES

TAP CARBONATION CONCENTRATOR

BACKGROUND OF THE INVENTION

1. Field of the Invention

This invention relates generally to apparatus for and methods of dispensing carbonated drinks. More particularly, it relates to apparatus and methods for improving carbonation in a soda fountain drink post-mix at a point within the cup of the served drink.

2. Background

Carbonated drinks (e.g., sodas) are extremely popular, and are typically served in one of two general forms: (1) pre-bottled or pre-canned; and (2) soda fountain mixed.

Bottled or canned sodas are hermetically sealed under pressure, and typically sit in transit, on shelves, etc., for significant periods of time, allowing carbonation to increase and reach equilibrium within the bottle or can before being opened and served. From a consumers point of view, bottled and canned sodas exhibit a relatively good amount of carbonation.

On the other hand, soda fountains mix carbonation, water and syrup just before it is served to a consumer. Soda fountains are extremely popular in food establishments, in large part because of the decreased costs associated therewith. Soda taps mix syrup for a particular flavor or brand of soda with water and $CO_2$, and present the mix to a tap, from which a cup is filled. Drinks from a soda tap are not hermetically sealed, and are intended for consumption within 15 minutes to one-half an hour, or even as much as an hour or so.

It is well known that carbonated drinks, be it pre-bottled or fountain mixed, will become flat after an extended amount of time after they are served (i.e., poured into a cup). Thus, the consumer who prefers a significant amount of carbonation must consume a poured carbonated drink rather quickly after it has been served.

FIG. 11 shows a conventional soda tap fountain head 700 dispensing mixed syrup and carbonated water into a cup 702. As can be seen in FIG. 11, the soda tap fountain head 700 is located by an operator at or above the lip of the cup 702, and mixed soda is dispensed, often over ice 710 to chill the mix.

Using a soda fountain, the carbonated water and syrup are typically not chilled before being poured into the cup 702, so most drinks from a soda fountain are poured over ice 710 in the cup 702. Unfortunately, while the ice 710 does serve to chill the drink, it also serves to dilute the flavoring of the drink and quicken the loss of carbonation, again encouraging a consumer to consume a carbonated drink quickly after it has been served over ice.

In a soda fountain, while the water and syrup mix become carbonated before exiting the soda tap, a significant amount of carbonation is lost to the air as the soda is being poured over ice, and as the drink sits even for just a few minutes before consumption.

This loss of carbonation leads to waste of $CO_2$, and generally to some variation in the taste to the consumer due in part to the inconsistency and unpredictability in length of time after being poured before consumption, different amounts of ice used, different tap pouring heights, etc.

There is a need for improved carbonated drink tap apparatus and methods which efficiently provides improved carbonation and consistency from soda to soda.

SUMMARY OF THE INVENTION

In accordance with the principles of the present invention, a carbonation concentrator comprises a carbonated fluid direct passage to enclose and pass carbonated fluid directly into a bottom portion of a cup before release. A plunger is in communication with the passage. The plunger has a diameter closely corresponding to a diameter of a corresponding inside of a cup. The plunger provides a significant amount of back pressure in the bottom portion of the cup.

A method for causing increased carbonation of a carbonated drink once introduced to a cup in accordance with another aspect of the present invention comprises introducing a carbonated drink into a cup at a point significantly below a top lip of the cup. Significantly increased pressure is temporarily creating to only a portion of the carbonated drink below a given point in the cup.

In yet another aspect of the present invention, a cup lid comprises a sealing lip to secure the cup lid to a top of a cup. The cup lid includes a straw opening. A straw receiving passageway extends significantly from a rim of the straw opening in the cup downwards into the cup.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a method and apparatus for improving the carbonation in a soda fountain drink when served in a cup. In accordance with the principles of the present invention, a carbonation concentrator is inserted between the fountain head and the bottom portion of the cup (e.g., at the top of the ice) to cause backpressure at a point within the fluid of the cup as the soda is poured, increasing the absorption of the $CO_2$ carbonation into the poured fluid. The carbonation concentrator may be integrated into the fountain head, adapted to attach to an otherwise conventional fountain head (e.g., hand held, distribution on on-wall), integrated within the cup, or to a lid (i.e., disposable form).

Thus, the carbonation concentrator in accordance with the present invention takes advantage of the principle of Boyles Law—that the compressibility of a gas in a liquid increases as the pressure is increased, allowing the $CO_2$ carbonation to better saturate its liquid carrying agent for a longer lasting carbonated drink.

Figure 1:
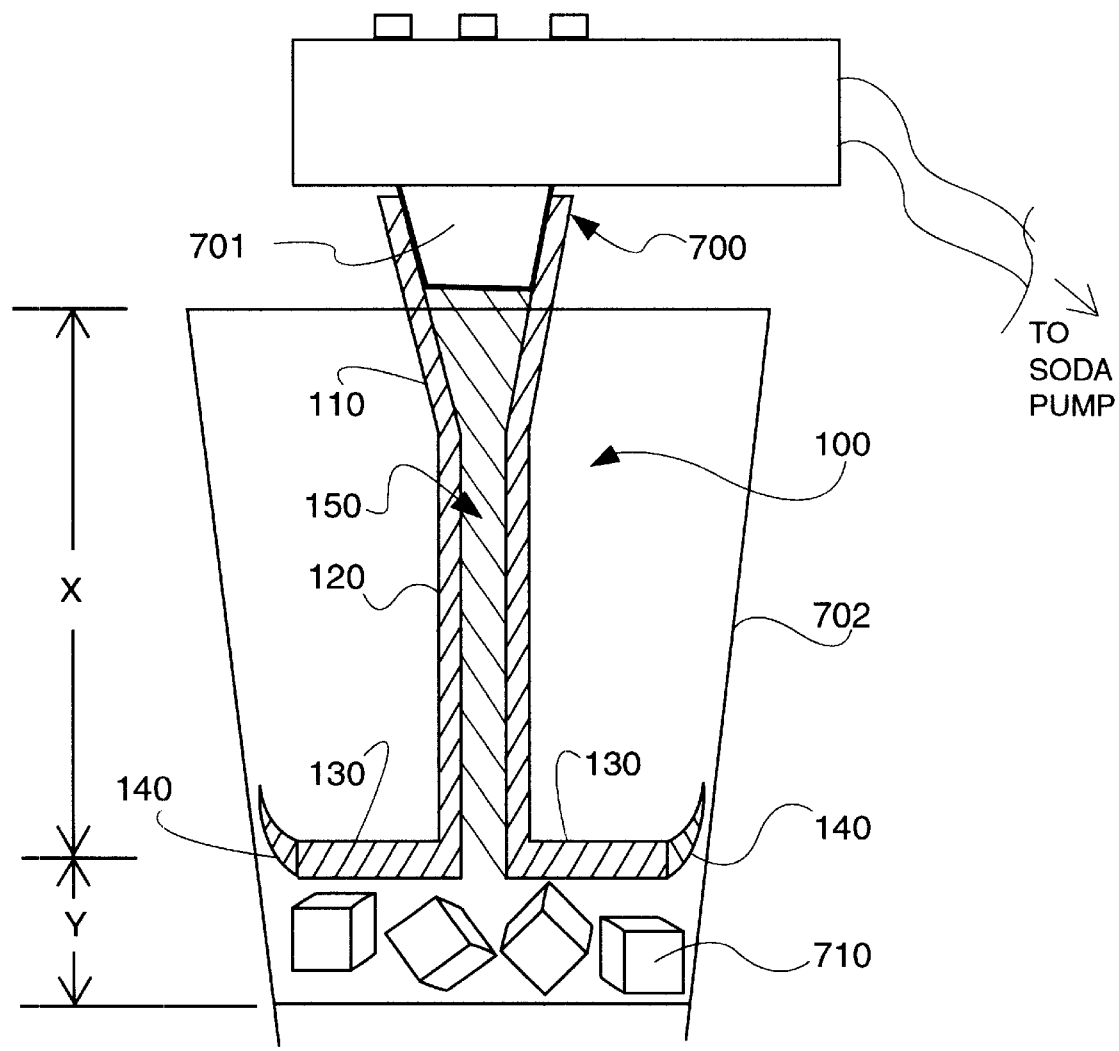
FIG. 1 shows an exemplary carbonation concentrator attached to a fountain head and inserted into a cup with ice, in accordance with the principles of the present invention.

FIG. 1 shows an exemplary carbonation concentrator attached to a fountain head and inserted into a cup with ice, in accordance with the principles of the present invention. Although shown as an attachment to an otherwise conventional fountain head 700, it will be clear to those of ordinary skill in the art that the carbonation concentrator may alternatively be molded or otherwise integrated within the fountain head 700 in a more permanent fashion.

As shown in FIG. 1, an exemplary carbonation concentrator 100 is attached to an otherwise conventional fountain head 700 via, e.g., a coupling formed by a fountain head receiving structure 110. In the given example, the fountain head receiving structure 110 of the carbonation concentrator 100 is slid over the spout 701 of the fountain head 700, and secured in an appropriate fashion. Appropriate securing mechanisms include, but are not limited to: (1) including screw threads on the inside of the fountain head receiving structure 110 and screwing the carbonation concentrator 100 onto the fountain head 700; (2) pressing a pin crosswise through both the fountain head receiving structure 110 and the spout 701; (3) epoxy or other glue technique; etc.

The carbonation concentrator 100 includes a hollow interior passage 150 allowing relatively unrestricted passage of the mixed drink directly toward the bottom of the cup 702 (e.g., preferably directly to the bottom ⅓ of the cup 702; e.g., where Y=⅓, X=⅔ as shown in FIG. 1). The diameter of the hollow interior passage 150 may be selected for the particular application, but preferably is sufficiently wide so as to provide minimal backpressure to the soda pump. The passage 150 may be, e.g., approximately ½", ¾" or 1", 1¼", 1½" in diameter, or larger.

While backpressure to the soda pump itself is not the aim of the invention, backpressure in the cup 702 is. Once the soda is directly deposited in the bottom of the cup 702, a pressure cap or plunger structure 130 at the bottom of the carbonation concentrator 100 preferably provides back pressure to the soda exiting the carbonation concentrator 100 suitable to increase the penetration of the carbonation into the fluid of the drink. Also, additional backpressure may be provided with a narrower tubular passageway between the top and the plunger 130.

Preferably a loose 'seal' is attempted between the edge 140 of the plunger 130 and the sides of the cup 702, but this 'seal' is not meant to be complete. In fact, fluid preferably escapes around the edge 140 of the plunger, but not without adding to the backpressure in the drink below the plunger 130 in the bottom of the cup 702.

In operation, the plunger 130 may be placed at any point 140 within the cup 702, but preferably within the bottom half of the cup, and most preferably within the bottom ⅓ of the cup, or even the bottom 20% of the cup (Y=⅕, X=⅘).

Also, the placement of the plunger 130 need not be changed during the pouring of the drink, i.e., it is preferred that it remain in the position 140 above the ice until the cup is full. But, the plunger 130 may alternatively be slowly brought out of the cup 702 as the drink is poured, but the plunger 140 should be maintained below the surface of the poured drink.

It is also preferably, though not absolutely necessary, to leave the carbonation concentrator 100 in place within the cup 702 for a few seconds after the entire drink has been poured, to maximize absorption of the carbonation into the fluid of the drink.

Figure 2:
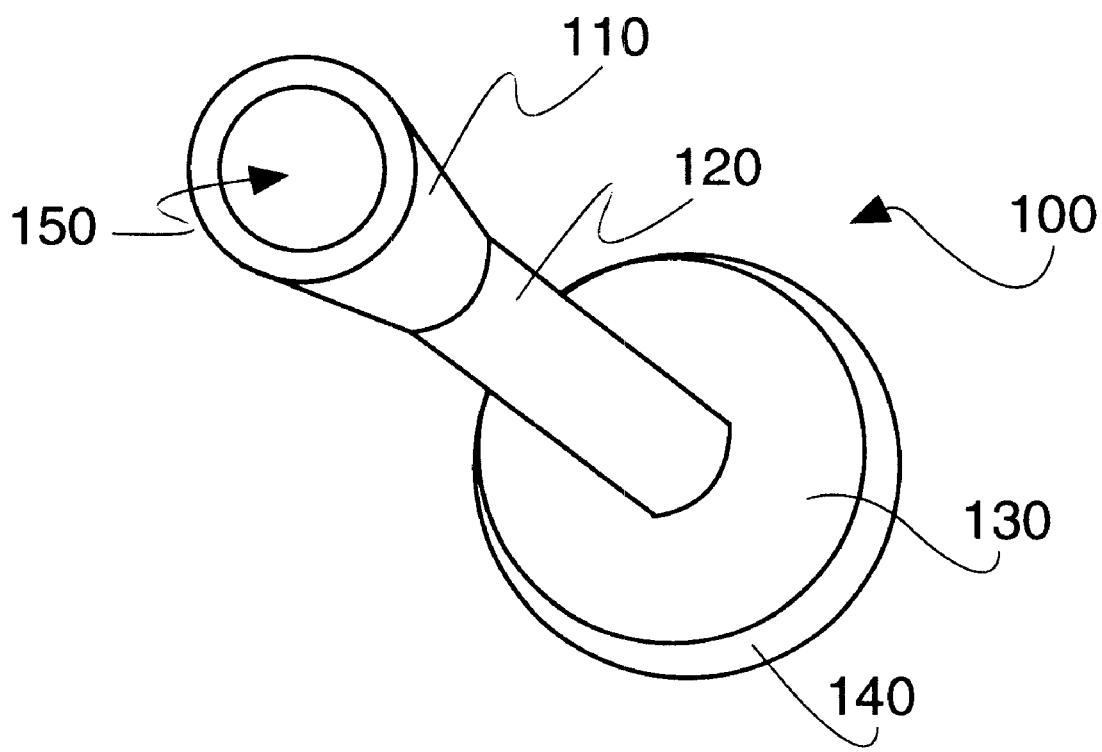
FIG. 2 is a three-dimensional view of the carbonation concentrator shown in FIG. 1.

FIG. 2 is a three-dimensional view of the carbonation concentrator 100 shown in FIG. 1.

In particular, as shown in FIG. 2, the carbonation concentrator 100 includes a fountain head receiving structure 110, e.g., a circular or conically shaped receptacle at the top of a passage 150. The passage 150 continues through a tube 120 toward the bottom of the carbonation concentrator 100. A plunger 130 and plunger edge 140 are located toward the lower portion of the carbonation concentrator 100.

Figure 3:
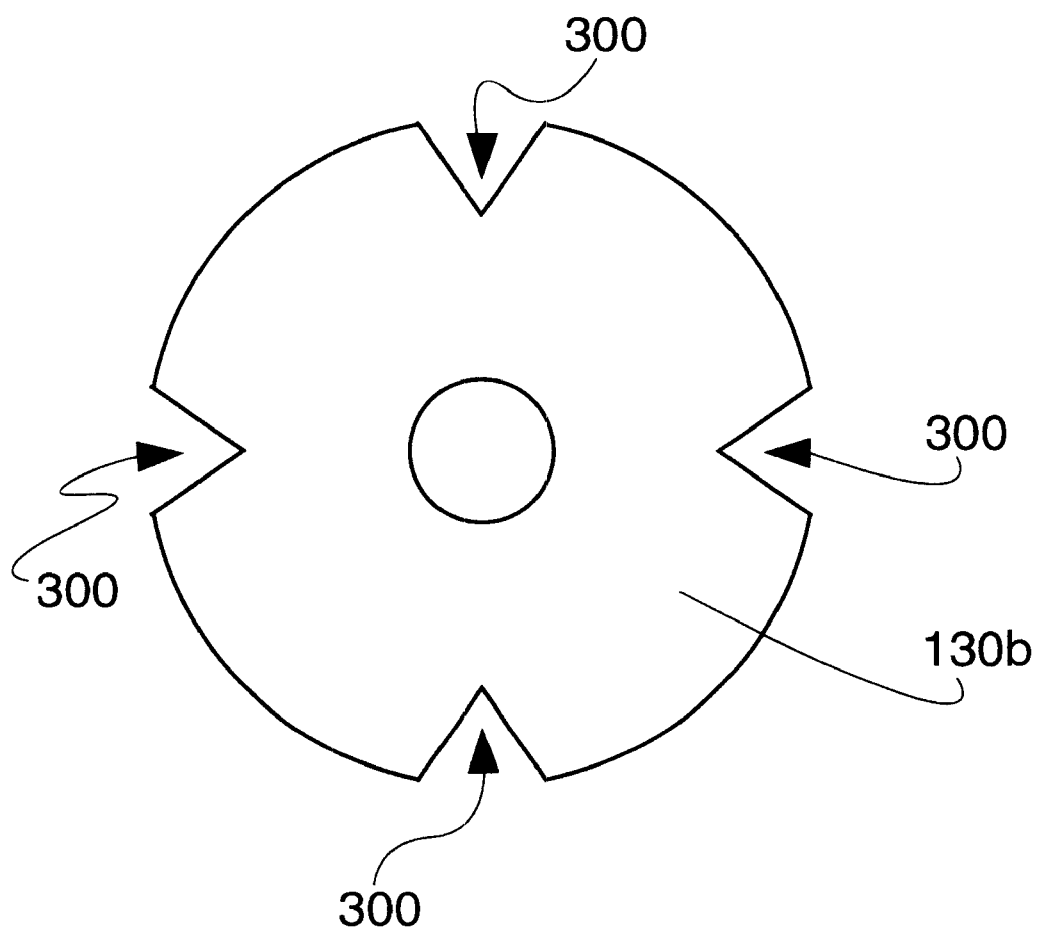
FIG. 3 is an alternative embodiment of the plunger portion of the carbonation concentrator, in accordance with the principles of the present invention.

FIG. 3 shows an exemplary alternative embodiment of the plunger portion 130 of the carbonation concentrator 100, in accordance with the principles of the present invention.

In particular, as shown in FIG. 3, one variation of the plunger 130 (referenced in FIG. 3 as 130b) includes a plurality of cut-out portions 300 to encourage and allow a given amount of soda to pass therethrough after having been 'concentrated' at the bottom of the cup 702 by the body of the plunger 130b. Preferably, the number, and/or shape of the cut-out portions is determined by a desired amount of back pressure to be maintained below the plunger 130b.

While the cut-out portions are shown both at the edge 140 and in triangular shapes, and/or in different shapes other than triangular (e.g., circular, rectangular, square, zig-zag, etc.), within the scope of the present invention.

FIGS. 4A through 4H show exemplary alternative embodiments of the plunger portion 130 of the carbonation concentrator 100, in accordance with the principles of the present invention.

Figure 4A:
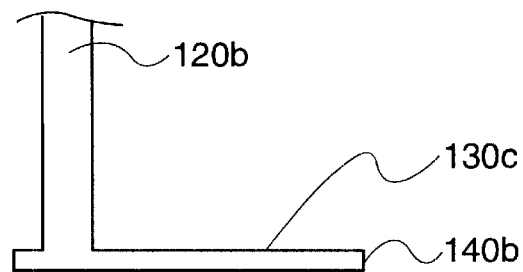
FIGS. 4A through 4H are exemplary alternative embodiments of the plunger portion of the carbonation concentrator, in accordance with the principles of the present invention.

In particular, as shown in FIG. 4A, the tube portion 120 of the carbonation concentrator 100 need not be centered on the plunger 130c.

Figure 4B:
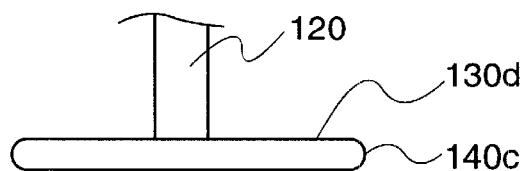

FIG. 4B shows that the edge 140c of the plunger 130d may be of any suitable shape attempting to match the cross-sectional shape of the cup 702. For instance, while the edge 140 is shown in FIG. 1 as having a flexible gasket type shape, the edge may simply be squared, or rounded as shown in FIG. 4B.

Figure 4C:
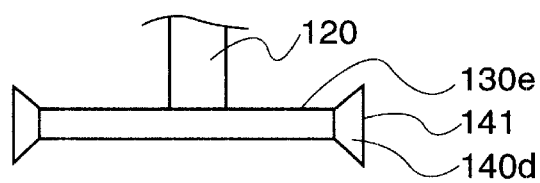

FIG. 4C shows that the edge 140d of the plunger 130e may have an enlarged surface 141 facing toward the side of the cup 702.

Figure 4D:
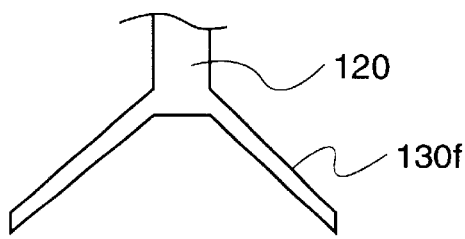

FIG. 4D shows that the plunger 130f may have three dimensional shaping, e.g., such as a conic shape. Note that this particular conic shaping of the plunger 130f tends to focus and increase the backpressure toward the center of the bottom portion of the cup 702.

Figure 4E:
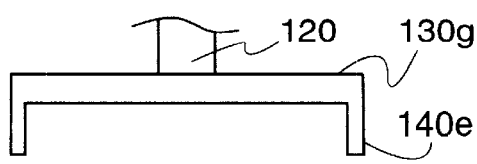

FIG. 4E shows that the edge 140e may have a simple 'reverse cupping' shape, which serves both to increase the area of the loose seal between the plunger 130g and the inside sides of the cup 702, and allows for less carbonation to escape upward thus dissolving additional carbonation into the liquid.

Figure 4F:
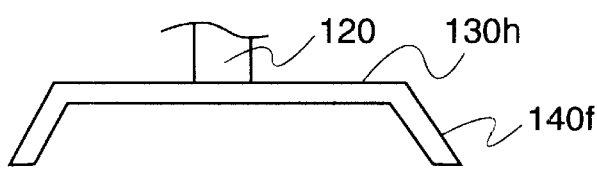

FIG. 4F shows yet another alternative embodiment of a plunger 130h/edge 140f combination, wherein the edge 140f tapers toward the bottom of the cup 702.

Figure 4G:
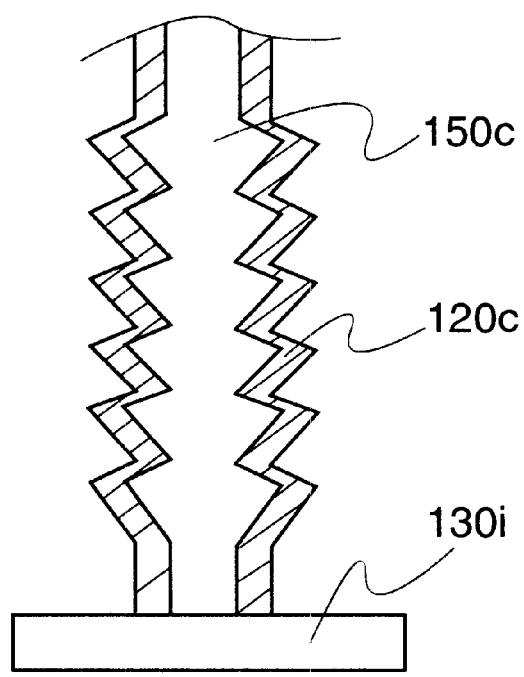

FIG. 4G shows an alternative embodiment of the tube 120c supporting a fluid passage 150c. In FIG. 4G, the tube 120c is extendible to a variable length. Thus, the overall length of the carbonation concentrator 100 may be lengthened or shortened, e.g., in correspondence with the approximate height of the particular cup 702 being used (e.g., small, medium, large, super size, etc.).

Note that the passage 150c within the tube 120c has a ribbed surface corresponding to the extendible ribbing on the outside of the tube 120. These internal surface features serve to increase fluid turbulence within the tube 120, increasing backpressure. Of course, the inside surface of the tube 120 may or may not have features, within the scope of the present invention.

Figure 4H:
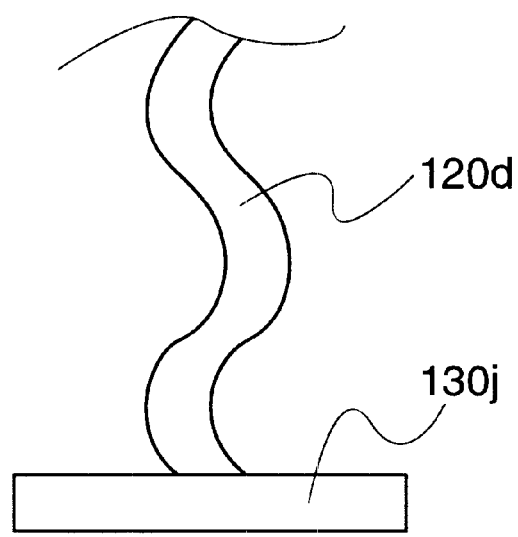

Another exemplary shaping of the tube 120d portion of the carbonation concentrator 100 shown in FIGS. 1 and 2 is shown in FIG. 4H. In particular, the tube 120d may have a non-linear structure, e.g., curved or wavy, as shown in FIG. 4H. While this particular shaping of the tube 120d adds attractiveness to the design of the carbonation concentrator 100, it also adds to the backpressure provided by the passage within the tube 120d.

Figure 5:
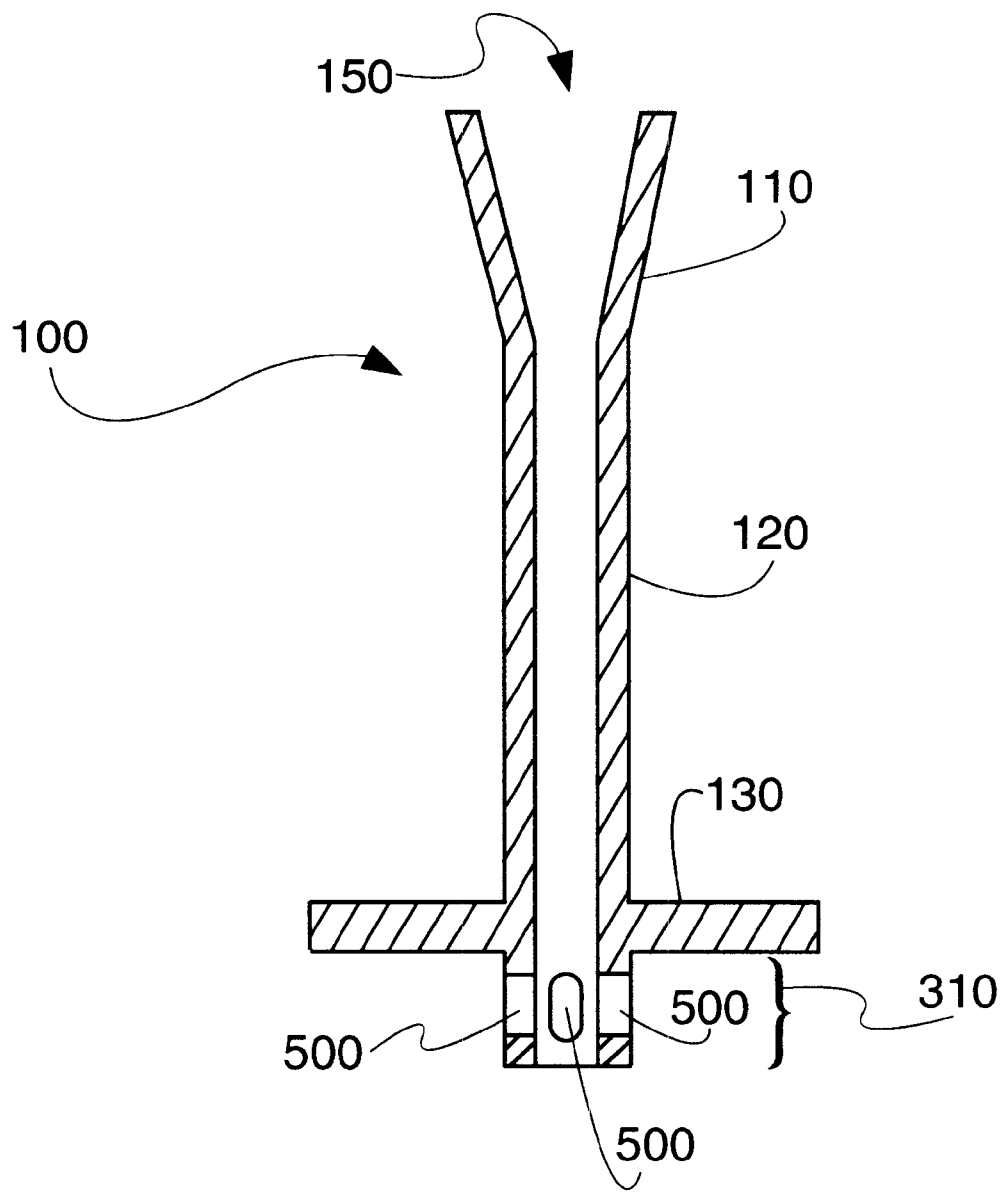
FIG. 5 shows the inclusion of openings or slits toward the bottom portion of the tube, as well as the extension of the tube below the plunger, in accordance with the principles of the present invention.

FIG. 5 shows the inclusion of openings or slits toward the bottom portion of the tube 120, as well as the extension of the tube 120 below the plunger 130, in accordance with the principles of the present invention.

To facilitate the exit of the mixed soda from the bottom of the tube 120, openings or slits 500 may be added in the tube 120, e.g., in the extended portion of the tube 310.

Figure 6A:
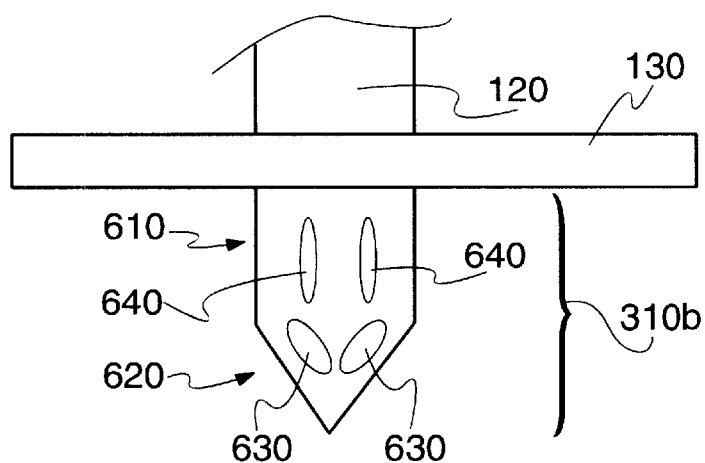
FIG. 6A shows an extended portion of the tube portion of a carbonation concentrator in accordance with the principles of the present invention shaped into a point and including openings and/or slits so that the carbonation concentrator may touch the bottom of the cup without blocking the exit of the passage, allowing greater carbonation with soda entry below the ice.

Other structure may be included at the bottom of the tube 120, e.g., in the extended portion 310b of the tube, to encourage the exit of soda from the bottom of the carbonation concentrator. For instance, as shown in FIG. 6A, the extended portion 310 may be shaped into a point 620 so that the carbonation concentrator may touch the bottom of the cup without blocking the exit of the passage 150. In such an embodiment, the tube 120, e.g., the extended portion 310b, includes openings and/or slits 630, 640.

Figure 6B:
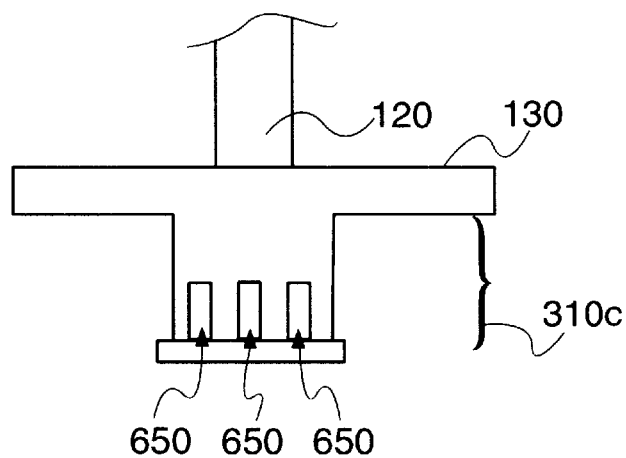
FIG. 6B shows yet another exemplary embodiment of an extended portion of the tube of a carbonation concentrator, in accordance with the principles of the present invention.

FIG. 6B shows yet another exemplary embodiment of an extended portion 310c of the tube 120 of a carbonation concentrator 100, in accordance with the principles of the present invention.

In particular, as shown in FIG. 6B, the extended portion 310c includes a castle-like shape including openings 650 such that the soda may exit the tube 120 through the openings 650 even when the bottom of the carbonation concentrator 100 rests on the bottom of the cup 702.

The extended portion 310 need not be straight. For instance, the extended portion 310 may curve upwards from the bottom of the cup.

Figure 7:
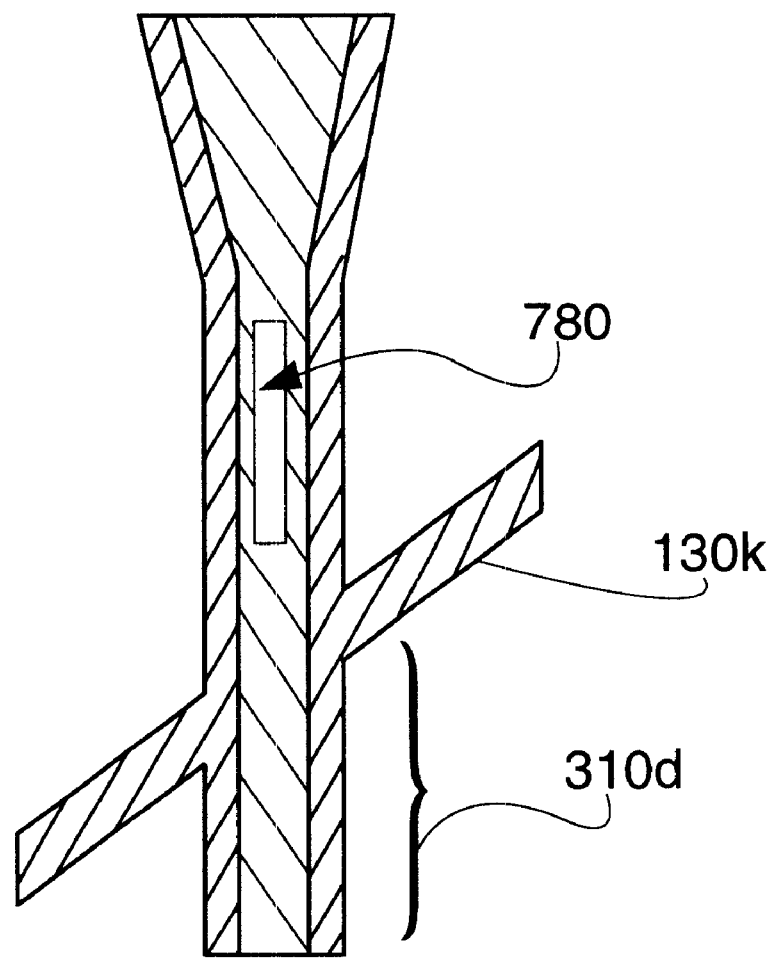
FIG. 7 shows still another example embodiment of a carbonation concentrator including a pressure release slit, in accordance with the principles of the present invention.

FIG. 7 shows still another example embodiment of a carbonation concentrator 100 including a pressure release slit 780, in accordance with the principles of the present invention.

In particular, as shown in FIG. 7, a pressure release valve 780, e.g., a slit may be included along the passage 150 to prevent damage to the soda pump in the event of excessive backpressure. The pressure release valve may be of a suitable size and designed to maintain a given pressure such that a desired amount of backpressure may be normally maintained within the tube 120.

FIG. 7 also shows that the plunger 130k need not be parallel to the bottom of the cup 702. Rather, as shown in FIG. 7, the plunger 130k may be angled, e.g., to allow for a cleaner removal of the carbonation concentrator 100 from the poured drink after the carbonation has been concentrated in accordance with the principles of the present invention.

Figure 8:
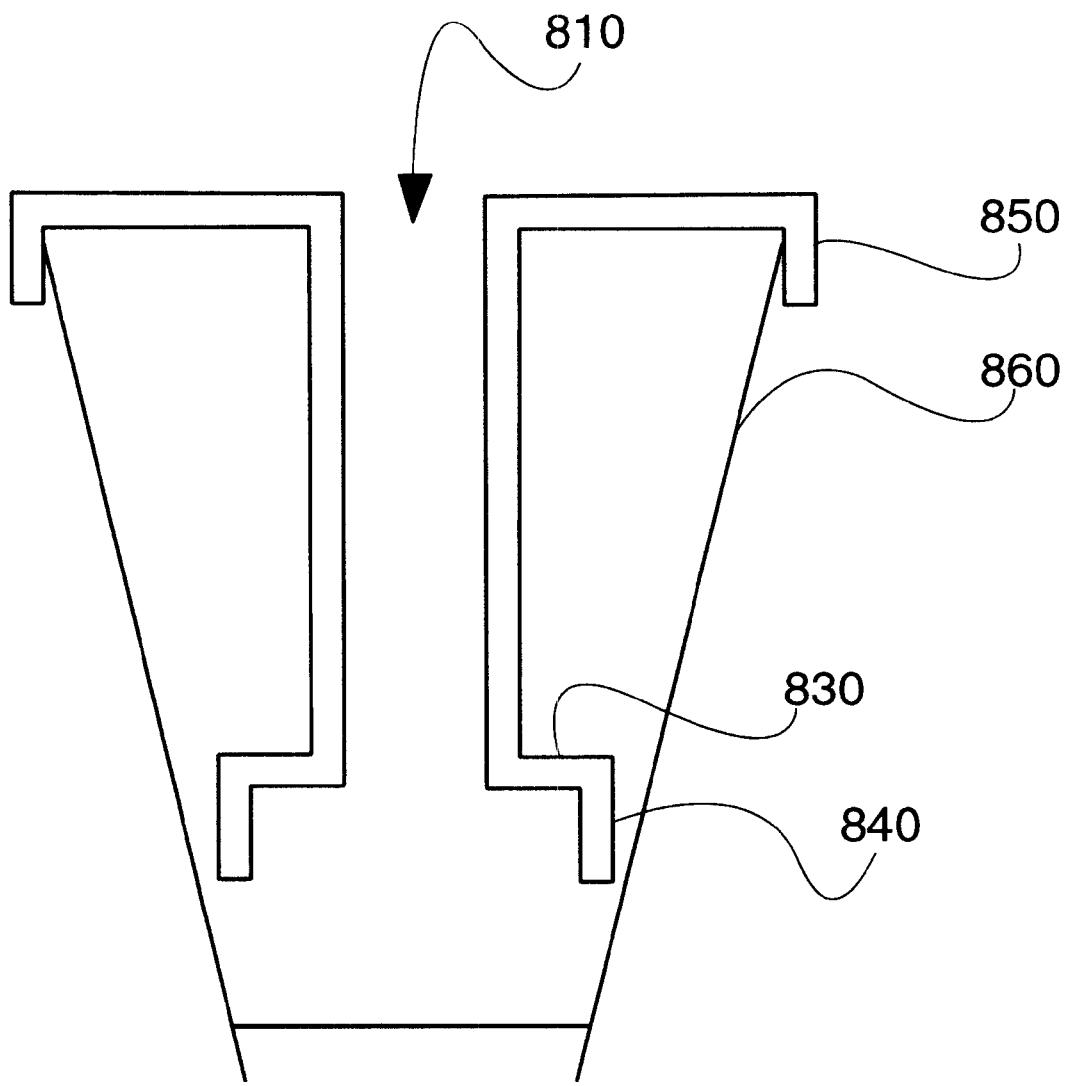
FIG. 8 shows a disposable carbonation concentrator formed of plastic, waxed paper or other suitable disposable cup material, served with a disposable cup and typical plastic lid sealed on the top lip of the disposable cup, in accordance with the principles of the present invention.

The carbonation concentrator 100 may be reusable, non-disposable or disposable and/or integrated within a disposable (or non-disposable) cup 702. For instance, FIG. 8 shows a disposable carbonation concentrator 800 formed of plastic, waxed paper or other suitable disposable cup material, served with a disposable cup 860 and typical plastic lid 850 sealed on the top lip of the disposable cup 860.

The disposable carbonation concentrator 800 may be integrated with a straw inserted through the passageway 810.

A plunger 830 in any suitable form as shown and described herein may be attached toward the bottom of the passageway 810.

The plastic lid 850 may be replaced with a handheld structure which supports the plunger 830 in an appropriate orientation and location towards the bottom of the cup 702.

Figure 9:
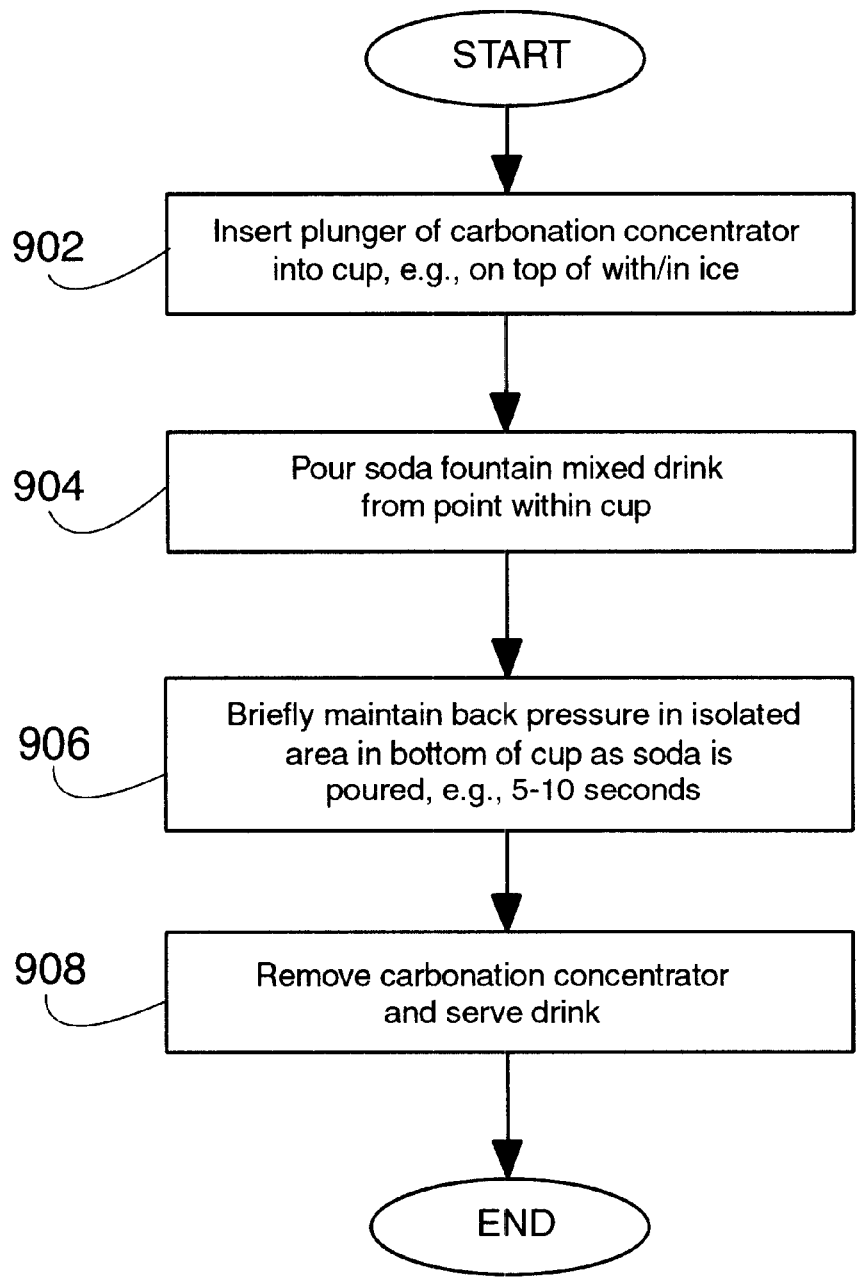
FIG. 9 shows an exemplary method of increasing carbonation in a soda fountain drink by concentrating an isolated portion of the soda in the served cup, in accordance with the principles of the present invention.

FIG. 9 shows an exemplary method of increasing carbonation in a soda fountain drink by concentrating an isolated portion of the soda in the served cup, in accordance with the principles of the present invention.

In particular, as shown in step 902, at least the plunger portion 130 of a carbonation concentrator 100 is inserted to a desired point within a cup to be filled with soda from a soda fountain. For instance, the plunger may be placed about ⅓ of the way up from the bottom of the cup, on top of the ice, etc.

In step 904, the soda is poured into the cup, but importantly from a point within the cup. In other words, the soda is not poured from above the cup or from the top portion of the cup as is provided by conventional fountain heads.

Also importantly, as shown in step 906, an amount of back pressure significantly greater than room pressure is maintained at least while the soda is being poured. The carbonation concentrator 100 may be removed once the drink is fully poured, or it may be maintained within the cup for a brief period of time longer, e.g., for up to 10 seconds longer, or preferably for 5–10 seconds or less, e.g., for 2 to 5 seconds after the drink is fully poured.

Afterwards, the carbonation concentrator 100 is preferably removed and the drink is served.

Figure 10:
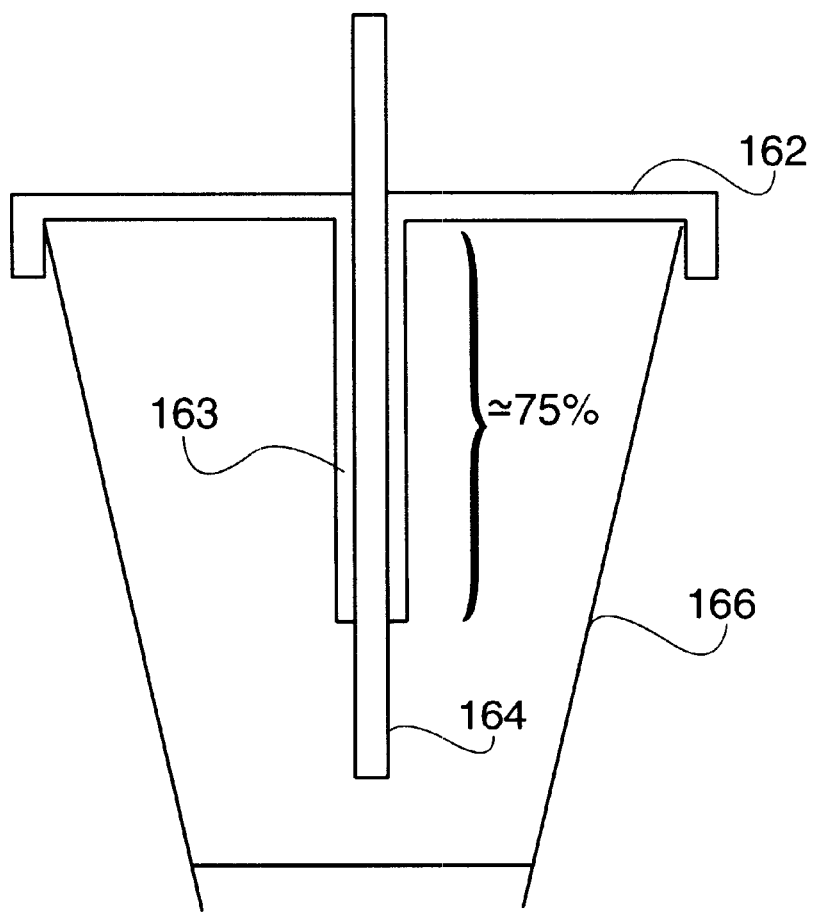
FIG. 10 shows yet another embodiment of the present invention, wherein a lid includes a straw receiving portion which extends toward the bottom of a cup, in accordance with the principles of the present invention.
Figure 11:
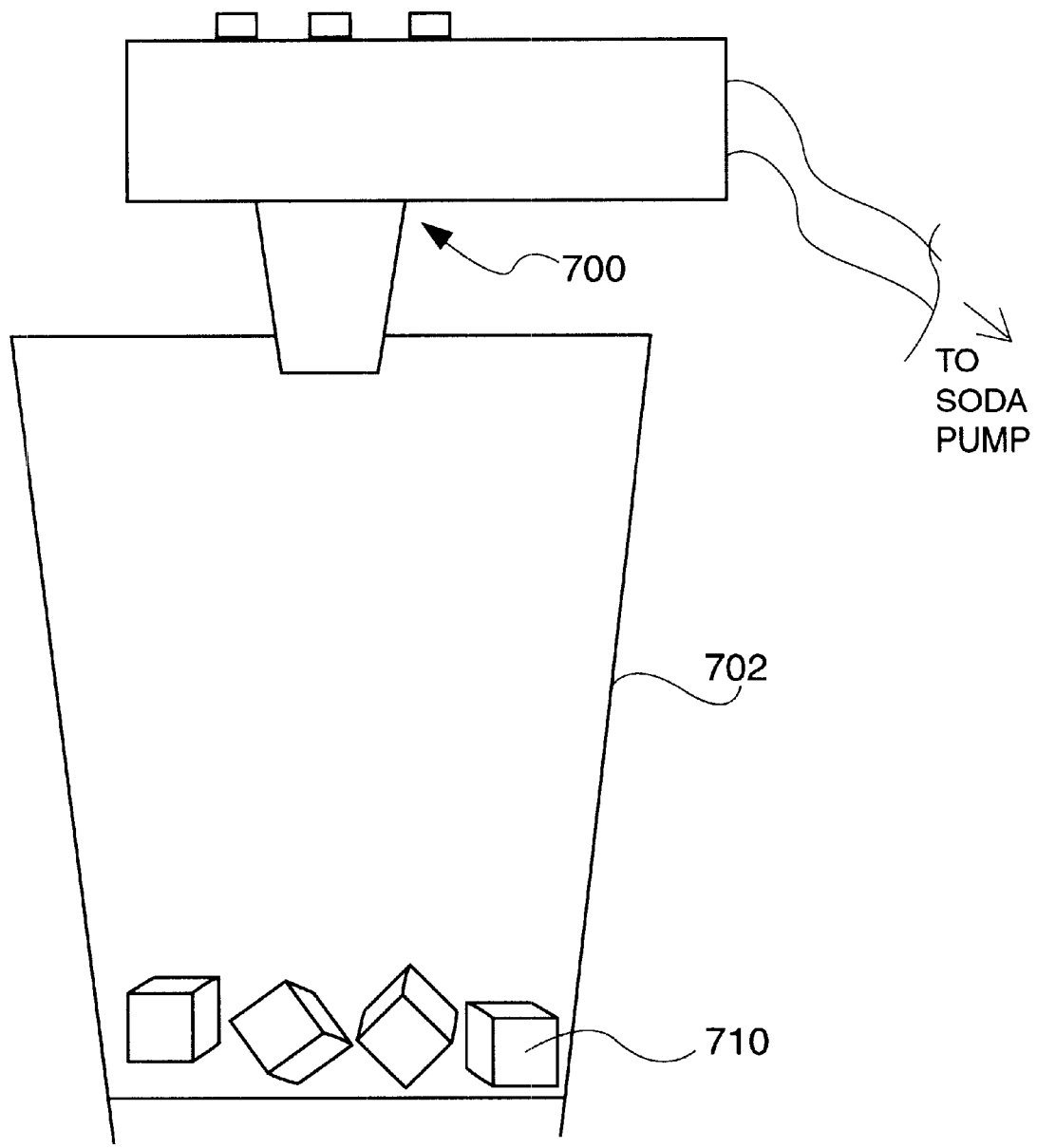
FIG. 11 shows a conventional soda tap fountain head dispensing mixed syrup and carbonated water into a cup.

FIG. 10 shows yet another embodiment of the present invention, wherein a lid includes a straw receiving portion which extends toward the bottom of a cup, in accordance with the principles of the present invention.

In particular, as shown in FIG. 10, a cup 166 includes a lid (e.g., a plastic lid) 162. The lid 162 includes a straw receiving portion 163 which extends downward into the cup 166. A straw 164 is closely received in a passageway formed by the straw receiving portion 163. While the tolerance between the outside diameter of the straw 164 and the inside diameter of the passageway formed by the straw receiving portion 163 is not necessarily airtight, the closer the tolerance, the better retention of carbonation within the soda.

In the disclosed embodiment, the straw receiving portion 163 extends downward for approximately 75% of the height of the cup 166. Of course, a person of ordinary skill in the art would appreciate that the straw receiving portion 163 may extend entirely to the bottom of the cup 166 (with, e.g., angled bottom to allow fluid passage through the straw 164), or may extend only partially into the cup (e.g., 50% of the height of the cup 166).

Accordingly, carbonation is improved within the drink by pressurizing a portion of the poured drink as it is poured, increasing the carbonation, providing more consistent carbonation, and generally improving the taste of a soda fountain drink. Thus, the present invention accommodates the use of additional syrup, allowing for a sweeter tasting soda more similar to that from a can or bottle. Carbonation bubbles appear to be smaller, and remain within the carbonated drink longer, as compared with conventional soda tap techniques of pouring the drink from the fountain tap placed above the lip of the cup.

While embodiments are shown with the plunger 130 sometimes placed on top of ice 710 poured into the cup 702, the plunger 130 may alternatively be placed within the ice 710, or even under the ice 710, within the scope of the present invention.

The tube 120 may be collapsible, e.g., to facilitate proper placement and force against the ice 710.

The diameter, thickness and/or angle of the plunger 130 can be of any suitable size within the teachings of the present disclosure. Although the length of the tube is preferably about 6", the diameter, length, etc. of the tube may be of any dimension suitable to the particular application.

Also, while the embodiments shown herein relate to a carbonation concentrator which is removable from a cup, the present invention also relates to a cup including an integrated carbonation concentrator apparatus.

The carbonation concentrator may be used for taps other than soda taps. For instance, the present invention is applicable for use with beer taps, e.g., to reduce "head" during pouring of the beer.

While the invention has been described with reference to the exemplary embodiments thereof, those skilled in the art will be able to make various modifications to the described embodiments of the invention without departing from the true spirit and scope of the invention.

What is claimed is:

1. A carbonation concentrator, comprising:
    a carbonated fluid direct passage to enclose and pass carbonated fluid directly into a bottom portion of a cup before release; and
    a plunger in communication with said passage, said plunger having a diameter closely corresponding to a diameter of a corresponding inside of a cup;
    wherein said plunger provides a significant amount of back pressure in said bottom portion of said cup.

2. The carbonation concentrator according to claim 1, further comprising:
    a fountain head receiving structure, in communication with said carbonated fluid direct passage, to secure said carbonated fluid direct passage to said carbonation concentrator.

3. The carbonation concentrator according to claim 1, wherein:
    said bottom portion of said cup is a bottom ½ of said cup.

4. The carbonation concentrator according to claim 1, wherein:
    said bottom portion of said cup is a bottom ⅓ of said cup.

5. The carbonation concentrator according to claim 1, wherein:
    said bottom portion of said cup is a bottom 20% of said cup.

6. The carbonation concentrator according to claim 1, wherein:
    said carbonated fluid direct passage is a tubular structure.

7. The carbonation concentrator according to claim 1, wherein:
    said carbonated fluid direct passage is extendible to accommodate a larger cup.

8. The carbonation concentrator according to claim 1, wherein:
    said carbonated fluid direct passage includes a pressure release valve.

9. The carbonation concentrator according to claim 1, wherein:
    said carbonated fluid direct passage is extended beyond said plunger.

10. The carbonation concentrator according to claim 9, wherein:
    said extension of said carbonated fluid direct passage includes at least one opening to allow carbonated fluid to pass therethrough when said extended passage is in contact with a bottom of said cup.

11. The carbonation concentrator according to claim 9, wherein:
    said extension of said carbonated fluid direct passage tapers to a point for simplified penetration through ice.

12. A method for causing increased carbonation of a carbonated drink once introduced to a cup, comprising:
    introducing a carbonated drink into a cup at a point significantly below a top lip of said cup; and
    temporarily creating significantly increased pressure to only a portion of said carbonated drink below a given point in said cup.

13. The method for causing increased carbonation of a carbonated drink once introduced to a cup according to claim 12, wherein:
    said carbonated drink is introduced into said cup at a point at least half way into said cup.

14. A method for causing increased carbonation of a carbonated drink once introduced to a cup, comprising:
    introducing a carbonated drink from a point-of-service soda fountain into a cup at a point significantly below a top lip of said cup; and
    temporarily creating significantly increased pressure to only a portion of said carbonated drink below a given point in said cup.

15. A method for causing increased carbonation of a carbonated drink once introduced to a cup, comprising:
    introducing a carbonated drink into a cup at a point significantly below a top lip of said cup; and
    temporarily creating significantly increased pressure to only a portion of said carbonated drink below a given point in said cup, said increased pressure being caused with a plunger inserted at least half way into said cup.

16. The method for causing increased carbonation of a carbonated drink once introduced to a cup according to claim 12, wherein:
    said carbonated drink is introduced into said cup at a point below ice in said cup.

17. Apparatus for causing increased carbonation of a carbonated drink once introduced to a cup, comprising:

means for introducing a carbonated drink into a cup at a point significantly below a top lip of said cup; and means for temporarily creating increased pressure to only a portion of said carbonated drink below a given point in said cup.

18. The apparatus for causing increased carbonation of a carbonated drink once introduced to a cup according to claim 17, wherein:

said means for introducing said carbonated drink introduces said carbonated drink into said cup at a point at least half way into said cup.

19. The apparatus for causing increased carbonation of a carbonated drink once introduced to a cup, comprising:

means for introducing a carbonated drink from a point-of-service soda fountain into a cup at a point significantly below a top lip of said cup; and means for temporarily creating increased pressure to only a portion of said carbonated drink below a given point in said cup.

20. The apparatus for causing increased carbonation of a carbonated drink once introduced to a cup, comprising:

means for introducing a carbonated drink into a cup at a point significantly below a top lip of said cup; and means, comprising a plunger, for temporarily creating increased pressure to only a portion of said carbonated drink below a given point in said cup.

21. The apparatus for causing increased carbonation of a carbonated drink once introduced to a cup according to claim 20, wherein:

said plunger has a diameter approximately the same as a corresponding inside diameter of said cup.

* * * * *